(12) United States Patent
Nager et al.

(10) Patent No.: US 9,540,114 B2
(45) Date of Patent: Jan. 10, 2017

(54) APU EXHAUST SYSTEM

(71) Applicant: United Technologies Corporation, Hartford, CT (US)

(72) Inventors: Eric Andrew Nager, El Cajon, CA (US); James C. Napier, San Diego, CA (US); Farooq Rehman, San Diego, CA (US); Anthony C. Jones, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/771,431

(22) PCT Filed: Mar. 3, 2014

(86) PCT No.: PCT/US2014/019824
§ 371 (c)(1),
(2) Date: Aug. 28, 2015

(87) PCT Pub. No.: WO2014/149604
PCT Pub. Date: Sep. 25, 2014

(65) Prior Publication Data
US 2016/0001890 A1    Jan. 7, 2016

Related U.S. Application Data

(60) Provisional application No. 61/789,811, filed on Mar. 15, 2013.

(51) Int. Cl.
*F02K 1/82*    (2006.01)
*F02K 1/34*    (2006.01)
*B64D 41/00*   (2006.01)
*F01D 25/30*   (2006.01)
(Continued)

(52) U.S. Cl.
CPC ............. *B64D 33/06* (2013.01); *B64D 41/00* (2013.01); *F01D 25/30* (2013.01); *F02C 7/24* (2013.01); *B64D 2041/002* (2013.01); *F02C 7/32* (2013.01); *F05D 2220/50* (2013.01); *F05D 2260/96* (2013.01); *Y02T 50/44* (2013.01)

(58) Field of Classification Search
CPC ........................................................ F02K 1/827
USPC ........................................... 181/213; 244/1 N
See application file for complete search history.

(56) References Cited

U.S. PATENT DOCUMENTS

| | | | | |
|---|---|---|---|---|
| 3,730,292 A | * | 5/1973 | MacDonald | ............ F02K 1/827 181/213 |
| 4,091,892 A | * | 5/1978 | Hehmann | ............ G10K 11/172 181/212 |
| 4,137,992 A | | 2/1979 | Herman | |

(Continued)

OTHER PUBLICATIONS

International Searching Authority, PCT International Search Report, Jun. 30, 2014, 3 pages.

*Primary Examiner* — Forrest M Phillips
(74) *Attorney, Agent, or Firm* — Kinney & Lange, P.A.

(57) ABSTRACT

An exhaust system for an APU in a gas turbine engine aircraft having a tail cone in which exhaust noise is reduced. An APU exhaust liner is attached to the APU and extending to an oval cutout at the tail cone The liner has a first constant cross section from the APU to a point proximate the tail cone, and a second, increasing cross section from the point proximate the tail cone to the liner cutout. The liner is turned toward the side of the tail. The liner cutout is further enlarged with at least one larger cutout.

18 Claims, 3 Drawing Sheets

(51) Int. Cl.
*F02C 7/24* (2006.01)
*F02C 7/32* (2006.01)

(56) References Cited

U.S. PATENT DOCUMENTS

| | | | |
|---|---|---|---|
| 5,782,082 A | 7/1998 | Hogeboom et al. | |
| 6,615,576 B2 * | 9/2003 | Sheoran | B64D 33/06 181/213 |
| 2006/0011408 A1 | 1/2006 | Kempton et al. | |
| 2006/0059674 A1 * | 3/2006 | Williams | B64D 41/00 29/402.08 |
| 2008/0115484 A1 * | 5/2008 | Conete | F02K 1/48 60/262 |
| 2009/0078496 A1 * | 3/2009 | Francisco | F01D 25/30 181/213 |
| 2012/0006614 A1 * | 1/2012 | Todorovic | F02K 1/34 181/213 |
| 2012/0273611 A1 * | 11/2012 | Francisco | B64D 33/06 244/1 N |

\* cited by examiner

APU EXHAUST SYSTEM

BACKGROUND

The current goal of the aircraft industry is to make products as quiet as possible. One component of noise generation is exhaust noise from an aircraft auxiliary power unit (APU), a gas turbine engine. While the aircraft is on the ground, the exhaust from the APU exits the aircraft and mixes with static air outside. This mixing of high velocity air and static air results in air shear, which causes noise.

This exhaust noise from an APU is generated downstream of any exhaust muffler and thus cannot be attenuated. The only way to reduce the shear effect is to reduce the exhaust velocity.

For a fixed exhaust mass flow, a larger duct results in slower exhaust velocity. A traditional approach to reducing shear has been to reduce the velocity by making the exhaust duct larger. In this case, the larger exhaust duct requires more metal in the liner and muffler. This adds undesirable weight to the system.

SUMMARY

Exhaust noise is reduced without adding significant weight to the system. An APU exhaust system has an exhaust liner diameter is suitable for the amount of exhaust produced by the APU. At the exit end of the APU, the diameter of the exhaust system is enlarged and the liner is turned to exit to the side through a side exhaust port. The exit port is enlarged and has an oval shape, thus reducing the velocity of the exhaust as it impacts stationary, surrounding air. Noise generated by the exhaust is reduced without adding significant weight to the system.

DETAILED DESCRIPTION

Figure 1:
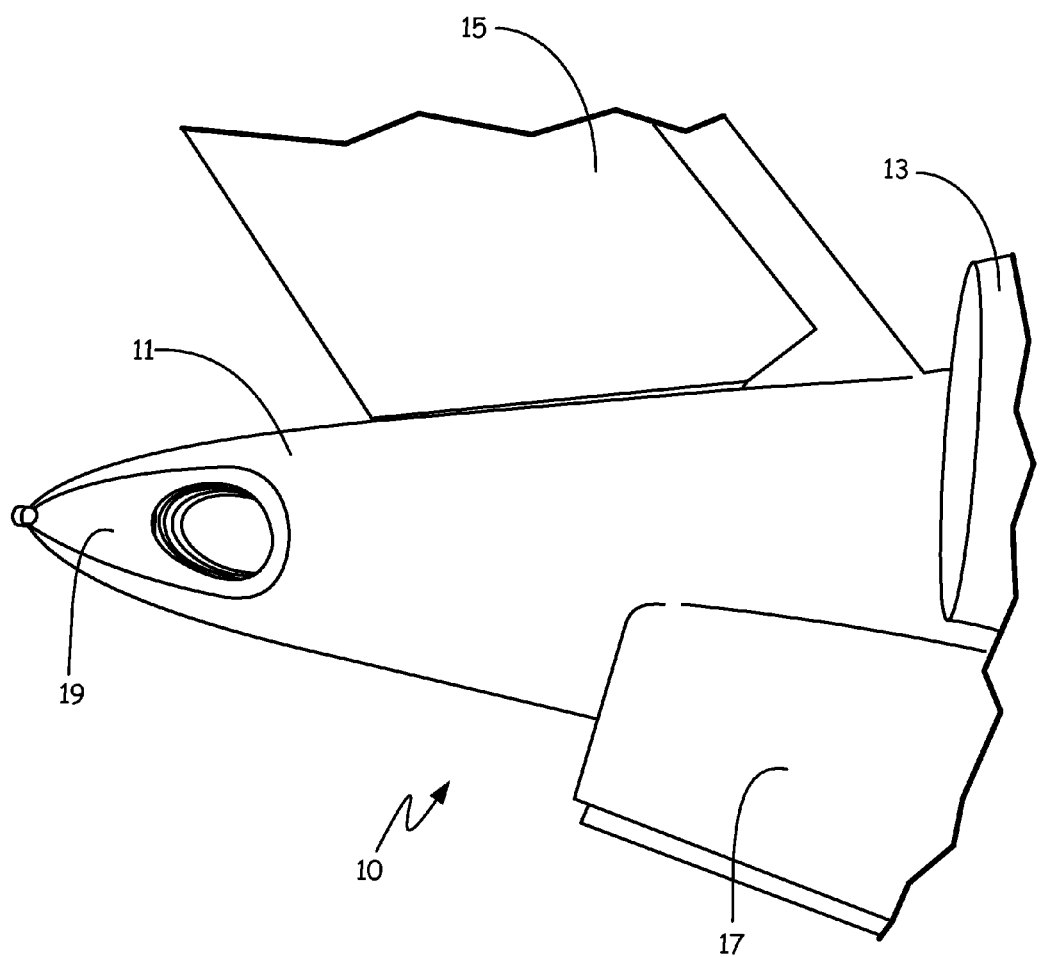
FIG. 1 shows the tail cone section of an aircraft.

A long range jet aircraft 10 is partially shown in FIG. 1. Aircraft 10 includes a tail cone 11, and partial views of engine 13, rudder 15 and wing 17. Exhaust from the engine exits exhaust 19.

Figure 2:
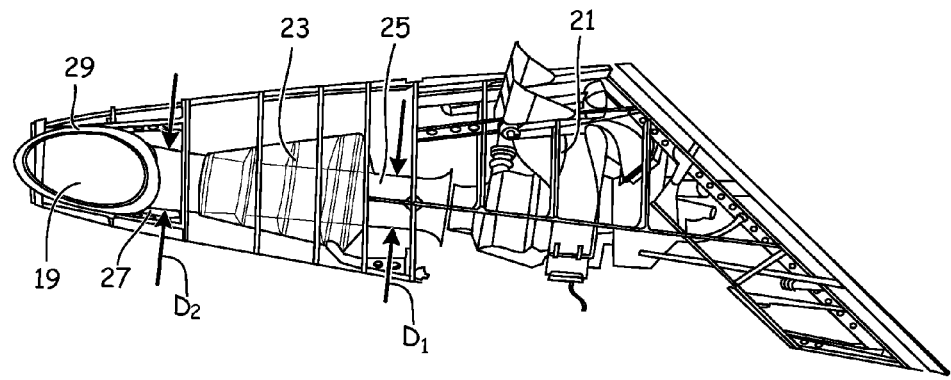
FIG. 2 shows an exhaust system diffusing liner of an APU in a tail section with the outer skin of the fuselage removed.

FIG. 2 shows auxiliary power unit (APU) 21, which generates exhaust into muffler 23. Muffler 23 is encased by liner 25, which is attached to APU 21. Liner 25 has a first diameter D1 that is sized to accept the exhaust from APU 21. Exhaust gasses flow in liner 25 to a point proximate the tail cone end 27, where liner 25 flares to a second and enlarged diameter D2. At tail cone end 27, liner 25 has an elliptical or oval cross section exit 29 to further enlarge liner 25 at its exhaust end. The enlarged diameter D2 causes the gas in the exhaust to have a slower velocity. When the exhaust gas mixes with ambient air, there is substantially less shear, and thus less noise, as compared to a system without an enlarged side exhaust. Liner 25 is turned to discharge exhaust at exit 29 to the side of the aircraft.

Figure 3:
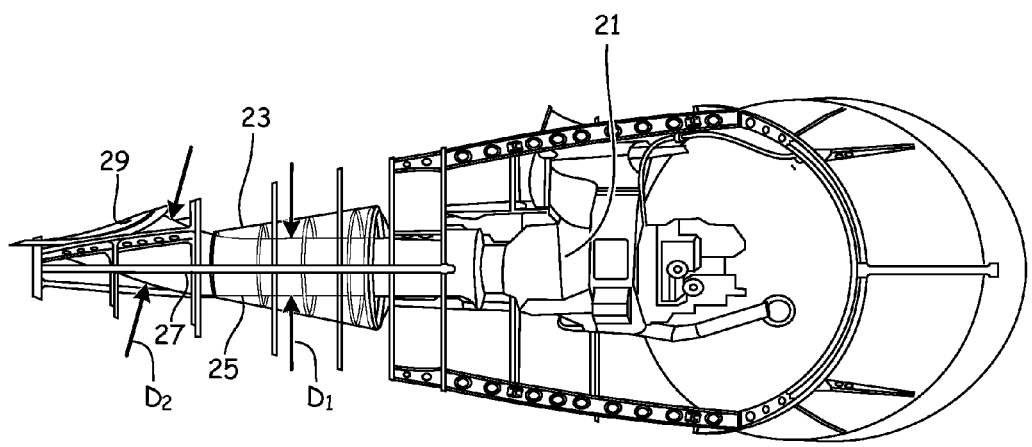
FIG. 3 is a bottom view of the AUP exhaust and framework of the tail section with the skin of the fuselage removed.

FIG. 3 shows APU 21 delivering exhaust to muffler 23 with liner 25 having a first diameter D1 up to tail cone end 27, where liner 25 is enlarged to second diameter D2 and turned so the exhaust is discharged via exhaust 19 to exit 29 to the side (i.e., upwards with respect to FIG. 3), as noted above. Enlarged second diameter D2 and the relatively large cross-sectional area of exit 29 both serve to slow the velocity of the exhaust gasses and lower noise.

Figure 4:
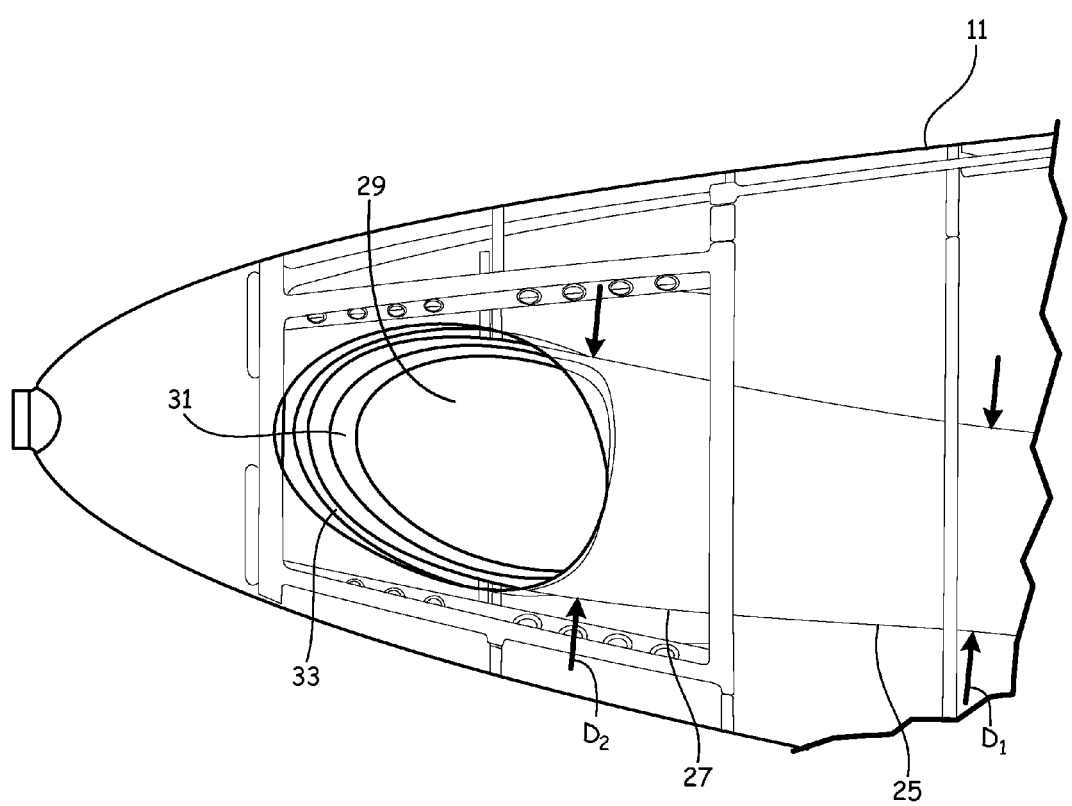
FIG. 4 is an enlarged schematic view of the tail cone cutout showing an embodiment further enlargement of the exhaust exit.

FIG. 4 shows tail 11 with liner 25 and first diameter D1. Liner 25 continues at tail cone end 27 with an enlarged second diameter D2 and exit 29. Exit cutout 29 further includes a first cutout 31, enlarging the oval shape and a second even larger oval cutout 33.

Instead of an entire liner of a larger diameter and exiting at the rear of the tail cone, as has been considered but which adds much more weight to the aircraft, this sideways exit decreases the momentum of the exhaust gasses and reduces its velocity, serving as a diffusing exhaust system with less noise.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The following are nonexclusive descriptions of possible embodiments of the present invention.

An exhaust system for an APU in a tail cone section of an aircraft having an exhaust outline on a side of the tail cone section fed by an APU exhaust liner attached to the APU. The liner has a first section with a constant cross section from the APU to a point proximate the tail cone and a second, larger diameter continuously increasing cross section from the downstream end of the first section to the outlet.

The system of the preceding paragraph can optionally include additionally and/or alternatively, any one or more of the following features, configurations and/or additional components.

The liner can be turned toward the side of the tail cone at the point proximate to it.

The liner has a first diameter of about 10.955 inches and a second diameter of about 13 inches.

The outlet can be oval in shape.

The outlet can be further enlarged with a second larger oval shape.

The outlet can be even further enlarged with a third oval of still larger shape.

A method for reducing exhaust noise in an APU in an aircraft having a tail cone, including the steps of receiving exhaust gas at an exhaust inlet adjacent the APU, directing the exhaust gas through the liner from the liner inlet to an outlet in a side surface of a fuselage tail section, the liner having a constant diameter, and discharging the exhaust gas out an outlet that has an expanded cross section and that turns the liner toward the side of the tail in the tail cone.

The method of the preceding paragraph can optionally include additionally and/or alternatively, any one or more of the following features, configurations and/or additional components.

The liner can be turned toward the side of the tail cone at the point proximate to the expanded liner cross section.

The liner has a first diameter of about 10.955 inches and a second diameter of about 13 inches.

The outlet can be oval in shape.

The outlet can be further enlarged with a second larger oval shape.

The outlet can be even further enlarged with a third oval of still larger shape.

A liner in an aircraft fuselage having a tail cone section exhaust liner for a APU, a muffler supporting the liner and an exhaust outlet.

The liner of the preceding paragraph can optionally include additionally and/or alternatively, any one or more of the following features, configurations and/or additional components.

The outlet can be oval in shape.

The outlet can be further enlarged with a second larger oval shape.

The outlet can be even further enlarged with a third oval of still larger shape.

The invention claimed is:

1. An exhaust system for an auxiliary power unit (APU) in tail cone section of an aircraft, the exhaust system comprising:
    an exhaust outlet on a side of the tail cone section;
    an APU exhaust liner attached to the APU and extending rearward from the APU to the exhaust outlet, the liner having a first section with a constant cross section from the APU to a point proximate the tail cone; and the liner having a second, larger diameter continuously increasing cross section from the downstream end of the first section to the outlet.

2. The exhaust system of claim 1, wherein the liner is turned toward a side of the tail at the tail cone.

3. The exhaust system of claim 1, where in the first diameter is about 27.8 cm (10.95 inches) and the second diameter is about 33.0 cm (13 inches).

4. The exhaust system of claim 1, wherein the exhaust outlet is oval in shape.

5. The exhaust system of claim 4, wherein the exhaust outlet is further enlarged with a second oval cutout of larger shape.

6. The exhaust system of claim 5, wherein the exhaust outlet is still further enlarged with a third oval cutout of still larger shape.

7. A method for reducing the exhaust noise in an auxiliary power unit (APU) in a gas turbine engine aircraft having a tail cone, the method comprising:
    receiving exhaust gas at a liner inlet adjacent the APU;
    directing the exhaust gas through the liner from the liner inlet to an outlet in a side surface of a fuselage tail section; and
    reducing the velocity of the exhaust gas in the liner before it exits the outlet in a region of the liner proximate the outlet by expanding the cross section of the liner and turning the enlarged liner to meet the outlet in a side surface of a fuselage tail section.

8. The method of claim 7, wherein the liner is turned toward the side of the tail at the tail cone.

9. The method of claim 7, where in the first diameter is about 27.8 cm (10.95 inches) and the second diameter is about 33.0 cm (13 inches).

10. The method of claim 7, wherein the liner outlet is oval in shape.

11. The method of claim 10, wherein the liner outlet is further enlarged with a second oval cutout of larger shape.

12. The method of claim 11, wherein the liner outlet is still further enlarged with a third oval cutout of still larger shape.

13. An exhaust liner for an APU in a gas turbine engine aircraft having a tail cone ending with an outlet for discharging exhaust, the liner comprising:
    a first section in the liner with a constant cross section from the APU to a point proximate the tail cone; and
    a second, larger diameter in the liner with a continuously increasing cross section from the downstream end of the first section to the outlet of the liner at the tail cone.

14. The exhaust liner of claim 13, wherein the exhaust liner is turned toward the side of the tail at the tail cone.

15. The exhaust liner of claim 13, where in the first diameter is about 27.8 cm (10.95 inches) and the second diameter is about 33.0 cm (13 inches).

16. The exhaust liner of claim 13, wherein the exhaust liner outlet is oval in shape.

17. The exhaust liner of claim 16, wherein the exhaust liner outlet is further enlarged with a second oval cutout of larger shape.

18. The exhaust liner of claim 7, wherein the exhaust liner outlet is still further enlarged with a third oval cutout of still larger shape.

* * * * *